United States Patent [19]
Sekiguchi

[11] Patent Number: 5,845,050
[45] Date of Patent: Dec. 1, 1998

[54] METHOD AND APPARATUS FOR PROCESSING INFORMATION AND A METHOD AND APPARATUS FOR EXECUTING A WORK INSTRUCTION

[75] Inventor: Minoru Sekiguchi, Kawasaki, Japan

[73] Assignee: Fujitsu Limited, Kawasaki, Japan

[21] Appl. No.: 371,430

[22] Filed: Jan. 11, 1995

[30] Foreign Application Priority Data

Feb. 28, 1994 [JP] Japan .................................. 6-029435

[51] Int. Cl.$^6$ .................................................. G06F 15/18
[52] U.S. Cl. ............................... 395/22; 395/11; 395/94; 382/153
[58] Field of Search ................................ 395/22, 23, 24, 395/10, 11, 27, 94; 382/153

[56] References Cited

U.S. PATENT DOCUMENTS

| | | | |
|---|---|---|---|
| 5,005,147 | 4/1991 | Krishen | 364/578 |
| 5,099,436 | 3/1992 | McCown et al. | 364/550 |
| 5,107,454 | 4/1992 | Niki | 395/24 |
| 5,129,039 | 7/1992 | Hiraiwa | 395/24 |
| 5,144,685 | 9/1992 | Nasar | 395/81 |
| 5,175,796 | 12/1992 | Refregier | 395/22 |
| 5,239,594 | 8/1993 | Yoda | 395/24 |
| 5,241,845 | 9/1993 | Ishibashi | 395/22 |
| 5,247,584 | 9/1993 | Krogmann | 395/22 |
| 5,276,772 | 1/1994 | Wang | 395/24 |
| 5,299,284 | 3/1994 | Roy | 395/24 |
| 5,303,330 | 4/1994 | Gersho | 395/24 |
| 5,363,305 | 11/1994 | Cox | 395/93 |
| 5,420,964 | 5/1995 | Sugasaka | 395/81 |

FOREIGN PATENT DOCUMENTS 0 246 517  5/1987  European Pat. Off. .

43 17 372  12/1993  Germany .

OTHER PUBLICATIONS

Ivan, "reeal–time data fusion for arterial street incident detection using neural networks," UMI dissertation services, Northwestern University, Dec. 1994.

Muller and Sachs, "Synthetic vision for improving flight control in night, poor visibility and adverse weather conditions," Technische Universitat Munchen, Arcisstr. 21, Munich Germany p.286, Oct. 1993.

Lederer, "A two stage neural network learning method for fusing disparate data modalities some of which are scarce," Proceedings of the Australian Confrence on neural networks ACNN p221, Feb. 1995.

Primary Examiner—Robert W. Downs
Assistant Examiner—Jeffrey S. Smith
Attorney, Agent, or Firm—Staas & Halsey

[57] ABSTRACT

A first information transforming unit, capable of learning, transforms state information acquired from an object into a first intermediate representation. A second information transforming unit, capable of learning, transforms knowledge information derived, from attributes of the object, by a human being into a second intermediate representation. A fusing unit produces a common intermediate representation using the first intermediate representation and the second intermediate representation. The common intermediate representation is used as a teacher signal in order to train the first and second information transforming units. Thereafter, an intermediate representation made by transforming state information acquired from a certain object will be consistent with an intermediate representation made by transforming knowledge information derived from the object by a human being.

6 Claims, 7 Drawing Sheets

Fig. 4

```
0000 : BLACK
0001 : RED(DARK)
0010 : BLUE(DARK)          0011 : MAGENTA(DARK)
0100 : GREEN(DARK)         0101 : YELLOW(DARK)
0111 : GRAY(DARK)  COMBINATION  0110 : CYAN(DARK)
1000 : GRAY(BRIGHT)   ⟶    1011 : MAGENTA(BRIGHT)
1001 : RED(BRIGHT)         1101 : YELLOW(BRIGHT)
1010 : BLUE(BRIGHT)        1110 : CYAN(BRIGHT)
1100 : GREEN(BRIGHT)
1111 : WHITE
```

Fig. 5

| FIRST INTERMEDIATE REPRESENTATION | 14 | 1000 | 0100 |
|---|---|---|---|
| SECOND INTERMEDIATE REPRESENTATION | 24 | 1010 | 0110 |
| COMMON INTERMEDIATE REPRESENTATION | 27 | 1010 | 0110 |

METHOD AND APPARATUS FOR PROCESSING INFORMATION AND A METHOD AND APPARATUS FOR EXECUTING A WORK INSTRUCTION

BACKGROUND OF THE INVENTION

1. Field of the Invention

The present invention relates to an information processing method and apparatus for transforming inexact information or a large amount of information into concise and compact information.

The present invention further relates to an information processing method and apparatus for making an inference or determination on the basis of transformed information as well as to a method and apparatus for executing a work instruction using a transformed intermediate representation.

2. Description of the Related Art

For expressing a certain concept, in general, inexact information or a large amount of information is employed. Assume that a work instruction saying "Catch an apple." is given to a robot. To execute this instruction, information representing the concept of "apples" must be processed. In a conventional information processing method, information representing respective attributes such as a color, a shape, a weight, a material, and a purpose is used to express the concept of "apples". The information concerning "apples" must be classified into a category of "apples" even though the apples may differ from one another in terms of color, shape, and other attributes.

In a method of communicating these information, information indicating that the color is red and the weight is small may be employed. As for this information, the amount of information is limited but the contents thereof are inexact. For building a concept on the basis of the inexact information, since some information may be missing, there is difficulty in building the concept exactly. When inexact information is used, knowledge information derived intentionally by a human being will not match exactly the information. For executing the foregoing work instruction, information processing such as inference and determination cannot be executed reliably.

In another method of communicating information, information representing a value that specifies each of attributes such as a color, a shape, a weight, a material and a purpose (for example, mass information of "apples" is represented in the form of XX g to YY g) is employed. When this kind of information is employed, inexactness can be overcome but an amount of information to be handled is tremendous. Processing of such a large amount of information is time-consuming. It is therefore impractical to use a large amount of information. This makes it necessary to extract only required information from a large amount of information and compress it.

When a work instruction saying "Catch an apple" is given, information based on knowledge information, which is intentionally derived from the concept of apples by a human being, must be consistent with information based on state information which is acquired from an apple by a robot. Unless the information is consistent, subsequent information processing such as inference or determination cannot be achieved reliably.

However, an information processing method, on an apparatus, that satisfies the aforesaid requirements has not been proposed in the past.

SUMMARY OF THE INVENTION

An object of the present invention is to provide an information processing method, and an apparatus, for extracting only required information from a large amount of information concerning a certain concept and transforming the extracted information into a compressed intermediate representation.

Another object of the present invention is to provide an information processing method, and an apparatus, in which an intermediate representation made by transforming knowledge information derived from a certain concept by a human being and an intermediate representation made by transforming state information acquired from an object covered by the concept are transformed into the same intermediate representation.

A yet another object of the present invention is to provide an information processing method, and an apparatus, that can make an inference or determination reliably and quickly, using a transformed intermediate representation despite the inexactness or size of the information, and to provide a method and apparatus for executing a work instruction.

To achieve the foregoing objects, according to the present invention, a first information transforming means transforms state information acquired from a certain object into an intermediate representation and a second information transforming means transforms knowledge information derived from the concept by a human being into an intermediate representation. The information transforming means may be systems capable of learning, for example, neural networks.

The two transformed intermediate representations are fused to produce a common intermediate representation. The common intermediate representation is given as a teacher signal to output units in each of the neural networks. The neural networks are then trained on the basis of a back-propagation rule.

Knowledge information concerning a certain concept is then input to the second neural network. When state information concerning the same concept is input to the first neural network, both the neural networks transform the knowledge information and state information into the same common intermediate representation.

The first and second neural networks and intermediate representations can be employed in executing a work instruction.

For example, state information resulting from execution of the work information by a robot is input to the first neural network. Knowledge information concerning a concept specified in the work instruction is input to the second neural network. If intermediate representations provided by the two neural networks are consistent with each other, it is determined that the robot has executed the work exactly.

BRIEF DESCRIPTION OF THE DRAWINGS

The above object and features of the present invention will be more apparent from the following description of the preferred embodiment with reference to the accompanying drawings, wherein:

FIG. 4 shows a bit configuration of color information in accordance with the present invention;

FIG. 5 shows a bit configuration of each intermediate representation in accordance with the present invention;

DESCRIPTION OF THE PREFERRED EMBODIMENTS

An embodiment of the present invention will be described with reference to the drawings.

Figure 1:
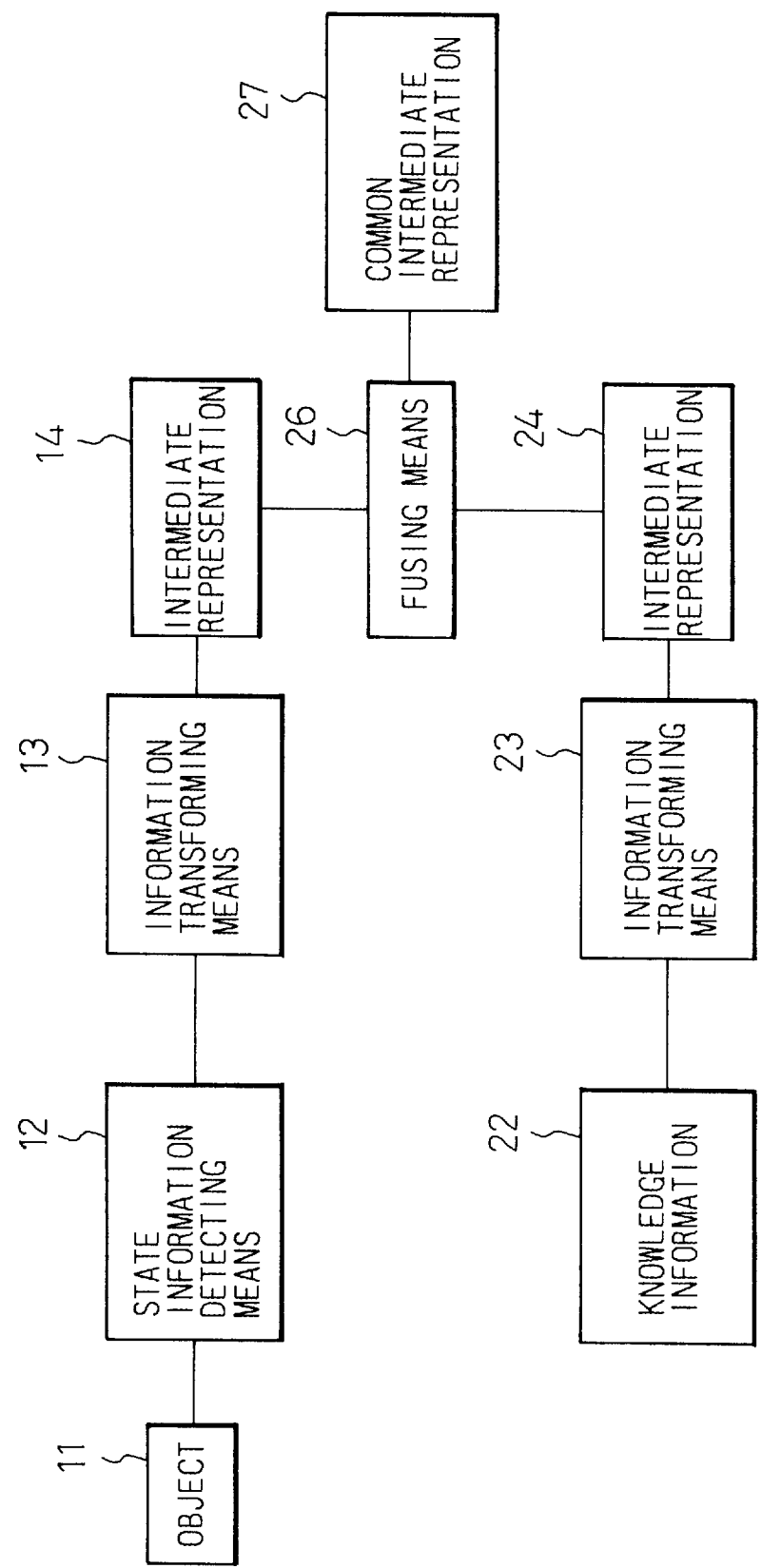
FIG. 1 is a block diagram showing an overall configuration of an embodiment of the present invention.

FIG. 1 shows an overall configuration of an embodiment of the present invention.

In FIG. 1, reference numeral 11 denotes an object covered by a certain concept, for example, an apple. 12 denotes a state information detecting means that is, for example, a sensor in a robot. 13 denotes a first information transforming means for transforming state information supplied from the state information detecting means into an intermediate representation. The first information transforming means 13 is a system capable of learning, for example, a neural network 14 denotes a first intermediate representation resulting from transformation performed by the first information transforming means 13.

Reference numeral 22 denotes knowledge information derived from the foregoing concept of "apples" by a human being. 23 denotes a second information transforming means for transforming the input knowledge information 22 into an intermediate representation. The second information transforming means 23 is a system capable of learning, for example, a neural network 24 denotes a second intermediate representation resulting from a transformation performed by the second information transforming means 23. 26 denotes a fusing means for fusing the first intermediate representation 14 and second intermediate representation 24 so as to produce a new common intermediate representation. 27 denotes a common intermediate representation produced by the fusing means 26.

Figure 2:
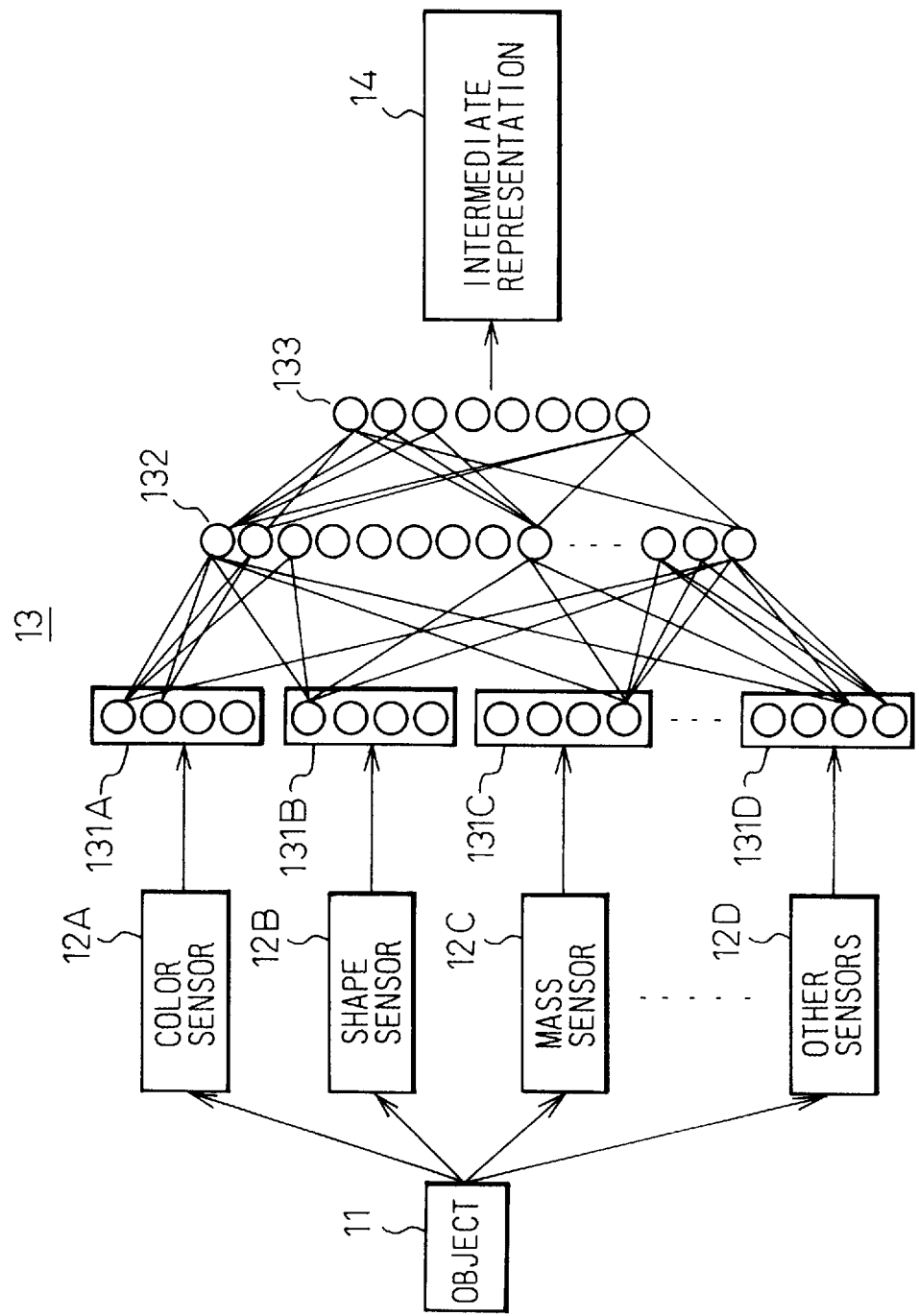
FIG. 2 details the circuitry for transforming state information into an intermediate representation in accordance with the present invention.

FIG. 2 details circuitry for producing a first intermediate representation using state information.

For detecting states of the object 11, a color sensor 12A, a shape sensor 12B, a mass sensor 12C, and other sensors 12D are made available. The color sensor 12A is composed of a photosensor for measuring a spectral reflectance or the like and an A/D converter, wherein the photosensor detects a wavelength of light reflected from the object and the A/D converter supplies color information in the form of a four-bit digital information. The shape sensor 12B consists of an image pickup means, for example, a camera and an image processing means, wherein the image pickup means detects a shape of the object 11 and the image processing means classifies the shape into a four-bit shape pattern. Likewise, the mass sensor 12C consists of a means for measuring a mass and an A/D converter, wherein a measured mass of the object 11 is transformed into four-bit mass information.

The information transforming means 13 is realized with a neural network. The neural network 13 comprises input units 131A to 131D, an intermediate unit 132, and an output unit 133.

Four-bit state information provided by each of the sensors 12A to 12D is input to each of the input units 131A to 131D in the first neural network 13. The neural network 13 transforms the state information into a first eight-bit intermediate representation 14.

Figure 3:
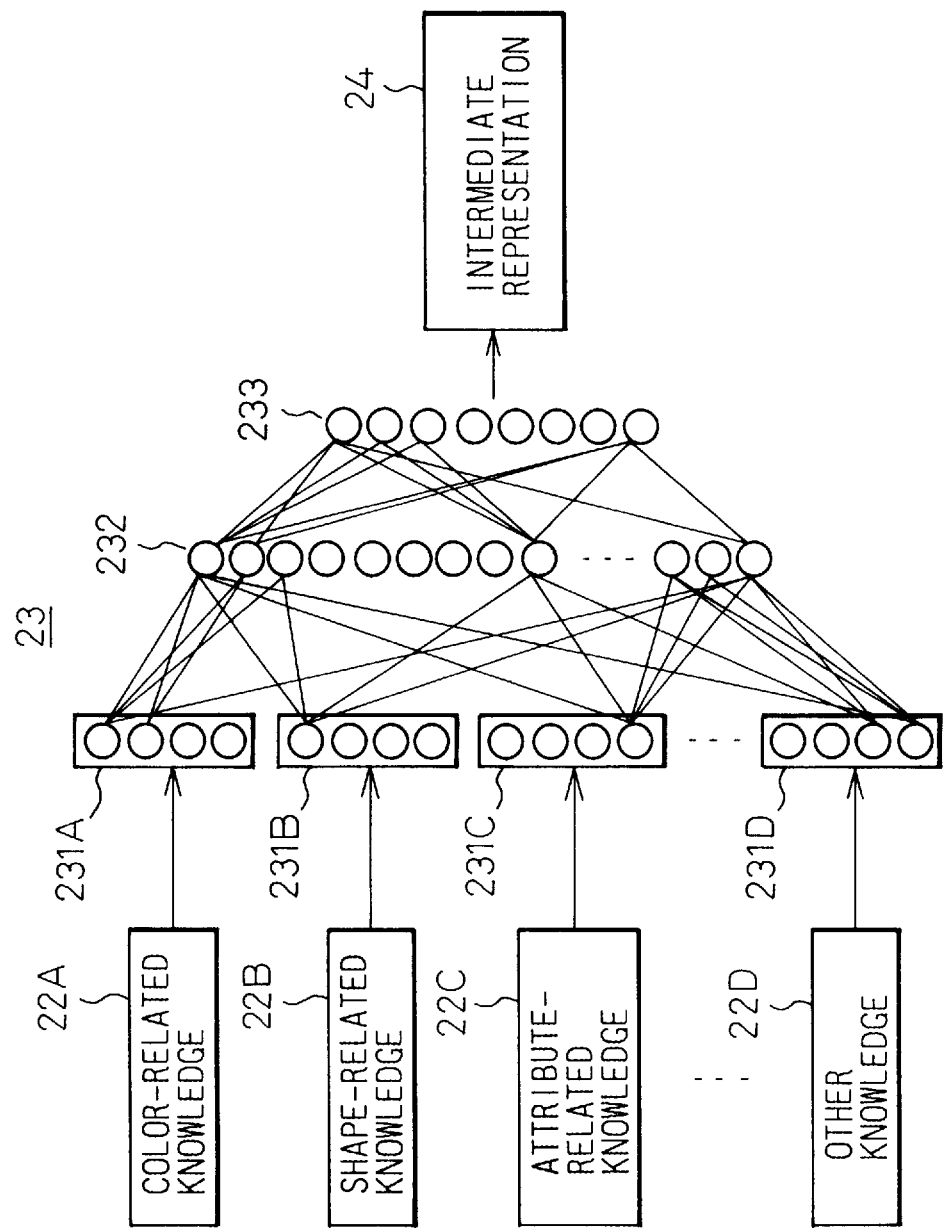
FIG. 3 details the circuitry for transforming knowledge information into an intermediate representation in accordance with the present invention.

FIG. 3 details circuitry for producing a second intermediate representation using knowledge information.

For the object 11 shown in FIG. 2, color-related knowledge information 22A, shape-related knowledge information 22B, mass-related knowledge information 22C, and other knowledge information 22D are made available. These kinds of knowledge information are specified according to quantities of properties of an object derived from the knowledge so that the knowledge can be classified readily. For example, when the object 11 is an apple, the knowledge information is specified as follows: the color is red, the shape is round, and the mass is 100 g.

The knowledge information is communicated as four-bit information for each attribute. For example, when color-related knowledge information is represented with four bits, bit combinations are determined as listed in FIG. 4. That is to say, 0000 is determined as black, and 0001 is determined as red (dark). 0010 is determined as blue (dark), etc., and 1110 is determined as light blue (bright). 1111 is determined as white. As for shape-related knowledge information, for example, 0001 is determined as a round shape, 0010 is determined as a triangular shape, and 0100 is determined as a square shape. The mass and other properties are specified according to quantities of the properties derived from knowledge.

The knowledge information 22A to 22D is input to the neural network 23 serving as the second information transforming means. The second neural network 23 comprises input units 231A to 231D, an intermediate unit 232, and an output unit 233. The neural network 23 transforms the input knowledge information into a second eight-bit intermediate representation 24.

Next, the operation of the circuitry shown in FIG. 1 will be described.

Assume that when neither the first nor second neural network has been trained yet, an apple is selected as the object 11. The sensors 12A to 12D detect state information concerning the apple and feed the state information to the first neural network 13. The knowledge information 22A to 22D concerning apples is input to the second neural network 23. The first neural network 13 transforms the state information into the first intermediate representation 14. The second neural network 23 transforms the knowledge information 22 into the second intermediate representation 24. The first intermediate representation 14 and second intermediate representation 24 may be identical to, or different from, each other. In other words, the intermediate representation based on the state information and the intermediate representation based on knowledge information, which are concerned with the same object 11, may be different from each other.

The fusing means 26 processes the first and second intermediate representations 14 and 24 so as to produce a common intermediate representation by calculating the AND or OR of the first and second intermediate representations 14 and 24 or by selecting either of each pair of bits of the first and second intermediate representations 14 and 24 according to probabilities. FIG. 5 demonstrates that a common intermediate representation 27 is produced by calculating bit by bit the OR of the the first and second intermediate representations 14 and 24. The intermediate representations 14, 24, and 27 may be analog values but not be digital values.

Next, the common intermediate representation 27 produced by the fusing means 26 is fed as a teacher signal to the output units 133 and 233 in the first and second neural networks 13 and 24. The first and second neural networks 13 and 23 are trained on the basis of a back-propagation rule.

Thereafter, when state information concerning a learnt concept is input to the first neural network 13 and knowledge information concerning the same concept is input to the second neural network, both the neural networks will reason out the same intermediate representation.

Mention has been made of a case in which one state information and one knowledge information are used to produce one common intermediate representation. The present invention can apply to a case in which a plurality of state information and one knowledge information are used to produce one common intermediate representation.

For example, the concept of "apples" also covers another kind of apple having a different color, shape, and weight. For producing one common intermediate representation for all kinds of apples having different attributes, the first and second neural networks 13 and 23 are trained using state information concerning the first apple and associated knowledge information. State information concerning the second apple whose attributes are different from those of the first apple is input to the first neural network 13. At this time, the second neural network 23 inputs the same knowledge information as the one concerning the first apple. The first neural network 13 provides an intermediate representation based on the state information concerning the second apple. The second neural network 23 provides a common intermediate representation produced previously. The fusing means 26 produces a new common intermediate representation using these two intermediate representations. Based on the new common intermediate representation, the first and second neural networks 13 and 23 are trained. Thereafter, the above procedure is iterated by a required number of kinds of apples having different attributes.

Thereafter, when state information concerning an apple having different attributes including a color and shape is input to the first neural network, as long as the information is concerned with an apple, the information will be transformed into the same common intermediate representation.

According to the present invention, different intermediate representations can be produced in order to build a plurality of different concepts including apples, oranges, etc.

Assume that "apples" has been learnt in the circuitry shown in FIG. 1 as mentioned previously. In this stage, state information acquired from an orange is input to the first neural network 13, and knowledge information derived from oranges is input to the second neural network 23. The subsequent procedure is identical to that described in conjunction with FIG. 1. Thus, a common intermediate representation of oranges is produced.

Figure 6:
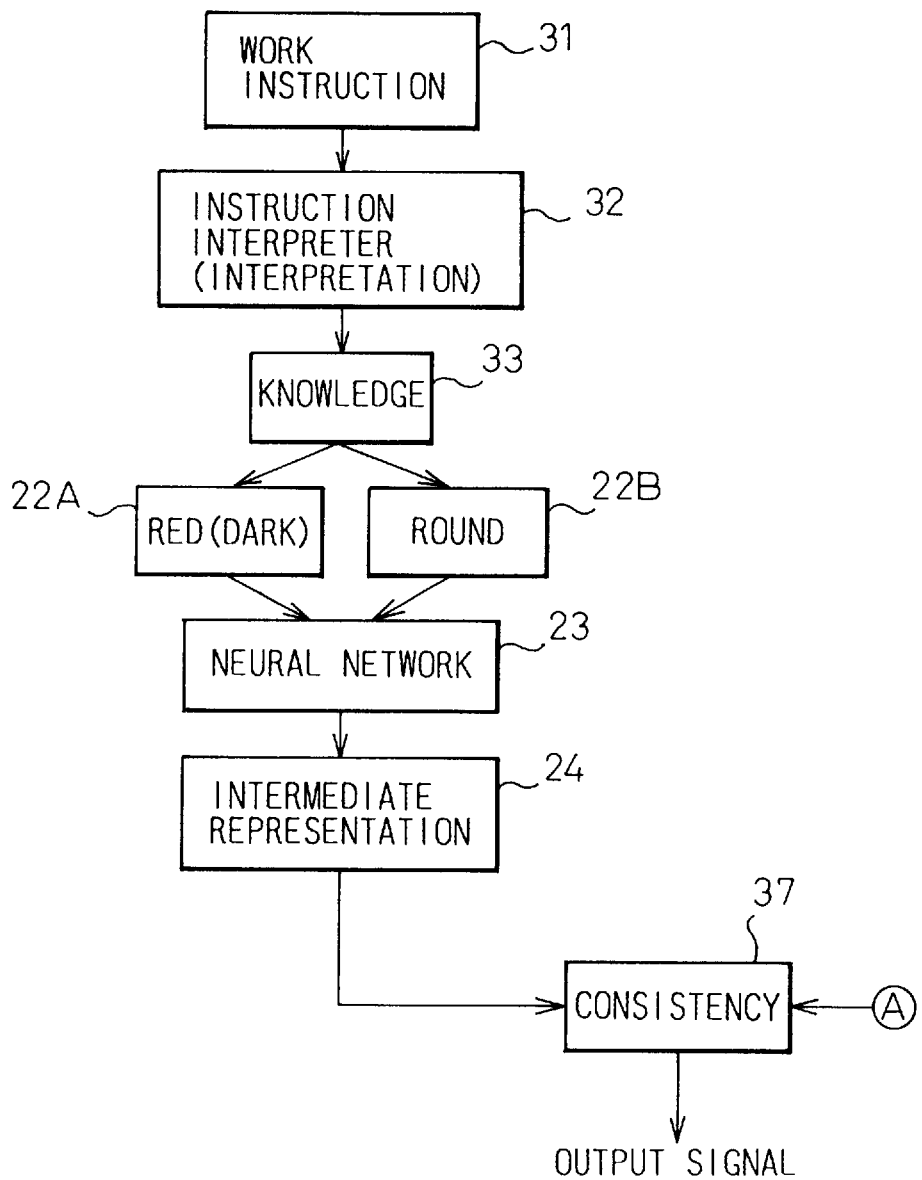
FIGS. 6 and 7 shows an example in which the present invention is implemented as object recognition performed by a robot.
Figure 7:
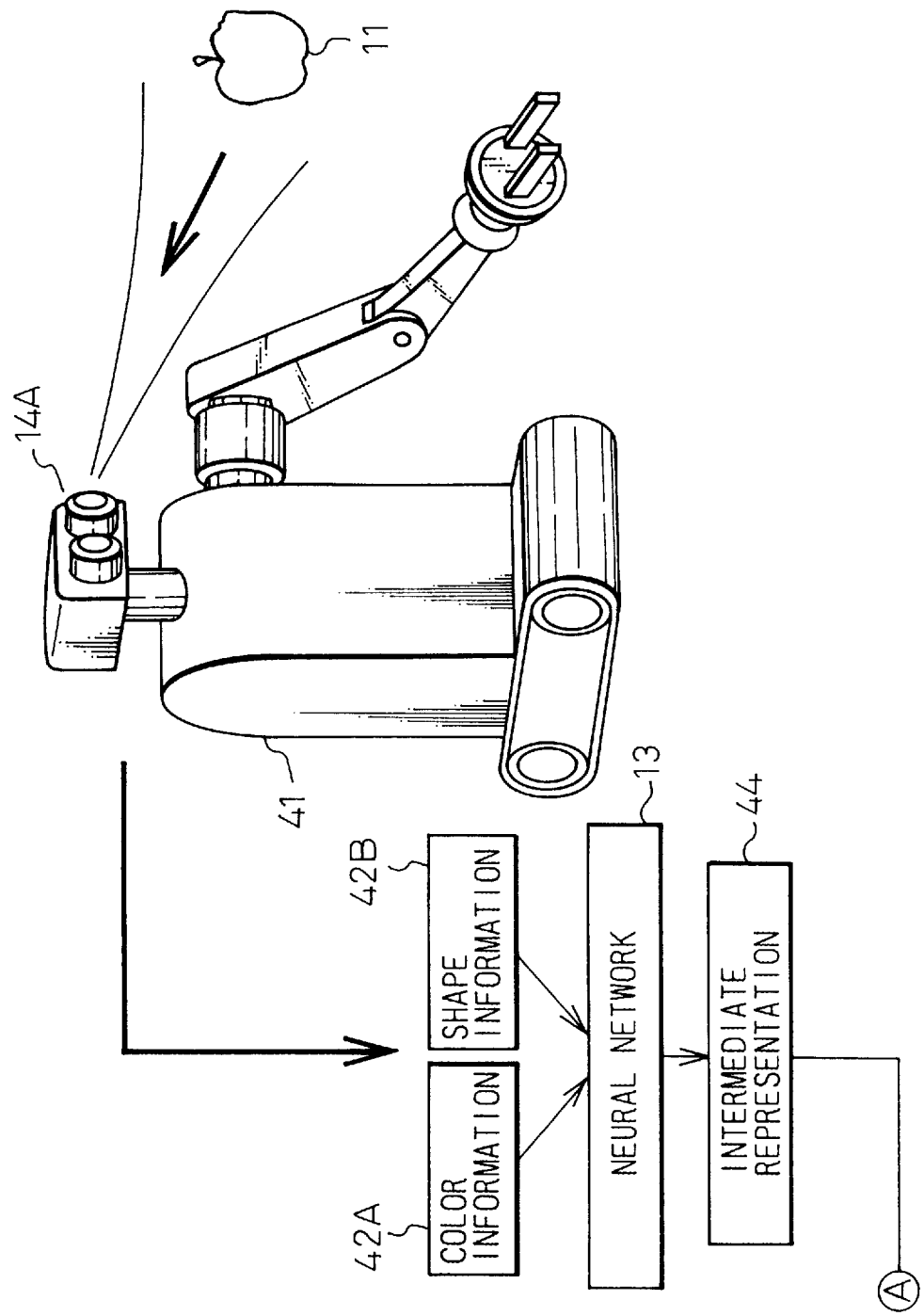

FIGS. 6 and 7 show an example in which the present invention is implemented in object recognition performed by a robot.

In FIG. 6, reference numeral 31 denotes a work instruction given to a robot by a human being, for example, "Catch an apple." 32 denotes an instruction interpreter for interpreting a work instruction. 33 denotes knowledge provided by the instruction interpreter 32, for example, "an apple." 22A and 22B denote knowledge information represented with bits and stored in association with the information 33 of an apple; such as, "red (dark)" and "round." 23 denotes the second neural network for transforming the knowledge information 22A and 22B into an intermediate representation. The second neural network has been trained as mentioned above. 24 denotes a second intermediate representation provided by the second neural network 23. 37 denotes a comparing means for comparing the second intermediate representation 24 with the first intermediate representation 14, which will be described later, so as to determine whether both the representations are consistent with each other.

In FIG. 7, reference numeral 41 denotes a robot. 41A denotes a sensor for acquiring state information. 42A and 42B denote state information, acquired by the sensor 41A, such as color information and shape information. 13 denotes a first neural network for transforming the state information 42A and 42B into an intermediate representation. The first neural network has been trained as mentioned above. 44 denotes a first intermediate representation provided by the first neural network 13.

Next, the operation of the circuitry shown in FIGS. 6 and 7 will be described.

First, a human being gives the work instruction 31 saying "Catch an apple." The instruction 31 is interpreted by the instruction interpreter 32, wherein the instruction 31 is interpreted and split into two kinds of information; "an apple" and "catch". The knowledge information 22A and 22B, which represents "red (dark)" and "round" in the form of bits and is stored in association with the knowledge 33 of an apple, is input to the second neural network 23. The second neural network 23 outputs the second intermediate representation 24 associated with the input information. Since the neural network 23 has been trained, the intermediate representation 24 is a common intermediate representation.

On the other hand, the sensor 41A in the robot 41 acquires state information including the color information 42A and shape information 42B from the object 11. The state information 42A and 42B is transformed into the first intermediate representation 44 by the first neural network 13.

The comparing means 37 compares the first intermediate representation 24 with the second intermediate representation 44. When both the representations are consistent with each other, a consistency signal is supplied. If the representations are inconsistent with each other, an inconsistency signal is supplied. When the comparing means 37 does not supply a consistency signal, the robot 41 allows the sensor 41A to acquire state information from subsequent objects until a consistency signal is supplied. When a consistency signal is supplied, it means that the robot 41 has succeeded in searching for "an apple." The robot 41 then executes the next instruction or "catch."

As mentioned above, according to the present invention, a human being can instruct the robot 41 to search for an apple merely by giving an inexact work instruction saying "Catch an apple."

In the aforesaid embodiment, a large storage capacity is needed in order to store all knowledge information in association with concepts. In contrast, when intermediate representations alone are stored in association with concepts, only a limited storage capacity is needed. When knowledge information concerning a certain concept becomes necessary, an associated intermediate representation is inversely transformed into knowledge information. Thus, the required knowledge information is made available. The employment of inverse transformation enables transformation of an intermediate representation into a representation understandable by a human being.

Figure 8:
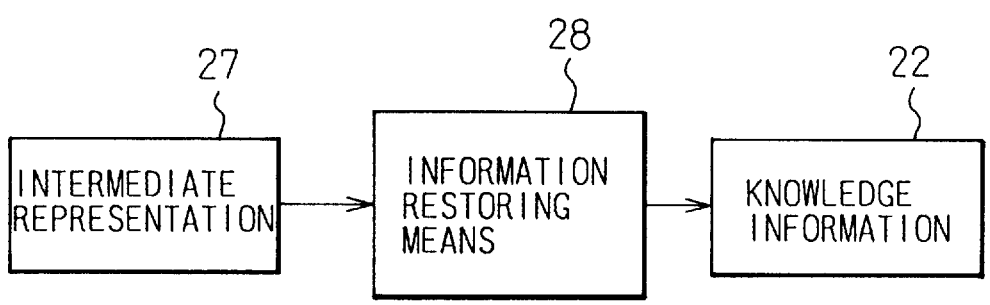
FIG. 8 shows a process of inversely transforming a common intermediate representation into knowledge information in accordance with the present invention.

FIG. 8 shows a process of inversely transforming an intermediate representation into knowledge information as mentioned above. In FIG. 8, reference numeral 27 denotes a common intermediate representation already produced. 28 denotes an information restoring means. 22 denotes knowledge information provided by the information restoring means 28. The information restoring means 28 is realized with the second neural network 23 shown in FIGS. 1 and 3. The output unit 233 in the second neural network 23 is used as an input unit for the information restoring means 28, while the input unit 231 therein is used as an output unit for the information restoring means 28.

Inverse information transformation is executable only when learning is achieved in the circuitry shown in FIGS. 1 and 3 by associating one knowledge information with one intermediate representation. Note that when one intermediate representation is associated with two or more kinds of knowledge information, even the circuitry shown in FIG. 8 cannot infer correct knowledge information from an intermediate representation.

I claim:

1. A learning method for a pattern recognition apparatus, comprising:

acquiring state information of an object;

providing a first neural network to learn to transform the state information into a first intermediate representation;

providing a second neural network to learn to transform input knowledge of the object into a second intermediate representation;

fusing said first intermediate representation and said second intermediate representation to produce a common intermediate representation of the object; and applying said common intermediate representation as a teacher signal to said first and second neural networks to train said first and second neural networks.

2. An information processing method according to claim 1, wherein, said fusing produces said common intermediate representation, by an OR operation on said two intermediate representations.

3. A pattern recognition method, comprising:

acquiring state information of an object;

providing a first neural network to transform the state information into a first intermediate representation;

providing a second neural network to transform input knowledge information of the object into a second intermediate representation;

fusing said first intermediate representation and said second intermediate representation to produce a common intermediate representation of the object, and training said first and second neural networks by applying a teacher signal derived from said common intermediate representation;

providing said trained first neural network to transform the state information of the object in to a third intermediate representation;

providing said trained second neural network to transform the input knowledge information to be compared to said state information of the object into a fourth intermediate representation; and comparing said third intermediate representation with said fourth intermediate representation to determine whether a concept represented by said state information of the object and a concept represented by said knowledge information to be compared with said state information of said object are consistent with each other.

4. A method of executing a work instruction, comprising steps of:

teaching a neural network to recognize an object, including the steps of:

acquiring state information of the object via a detection unit;

providing a first neural network to transform the state information of the object into a first intermediate representation, providing a second neural network to transform input knowledge information of the object into a second intermediate representation, fusing said first intermediate representation and said second intermediate representation to produce a common intermediate representation of the object, and training said first and second neural networks by applying a teacher signal derived from said common intermediate representation;

inputting a work instruction;

interpreting said input work instruction to identify separate units of information;

retrieving knowledge information concerning a concept represented by at least one of the separate units of information;

allowing said trained second neural network to transform said knowledge information into a fourth intermediate representation;

allowing said trained first neural network to transform said state information of an object into a third intermediate representation; and comparing said third intermediate representation with said fourth intermediate representation to determine whether a concept represented by said state information of the object and a concept represented by said knowledge information are consistent with each other.

5. A pattern recognition apparatus, comprising:

a first neural network, for transforming input state information into a first intermediate representation;

a second neural network for transforming input knowledge information into a second intermediate representation;

a fusing means for fusing said first intermediate representation and said second intermediate representation, applying said common intermediate representation as a teacher signal to said first and second neural networks, and thus training said first and second neural networks; and a comparing means for comparing a third intermediate representation which is transformed from state information of an object by said trained first neural network with a fourth intermediate representation which is transformed from knowledge information of an object to be detected by said trained second neural network, and determining whether or not the object and the object to be determined are consistent with each other.

6. A pattern recognition apparatus according to claim 5, further comprising:

means for interpreting an input work instruction and splitting it in units of information; and a means for retrieving knowledge information concerning a concept represented by said split information.

\* \* \* \* \*